United States Patent Office 3,210,350
Patented Oct. 5, 1965

3,210,350
TRIAZINE DERIVATIVES
Gaetano F. D'Alelio, South Bend, Ind., assignor, by direct and mesne assignments, to Dal Mon Research Co., Cleveland, Ohio, a corporation of Delaware
No Drawing. Filed Nov. 22, 1961, Ser. No. 154,359
13 Claims. (Cl. 260—248)

This invention relates to the production of new synthetic materials and more particularly to triazine phosphonic derivatives of particular utility in the plastics, coating, and various other arts.

The new compositions of this invention comprise triazine derivatives corresponding to the general formula, when the derivatives are prepared as described herein from phosphites:

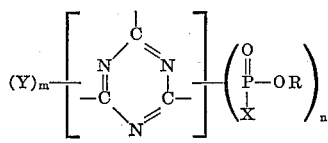

In the above formula $n$ and $m$ are integers of at least one and no more than two and the sum of $m$ and $n$ does not exceed three, Y represents any monovalent radical: when Y represents an aldehyde-reactable group it is sometimes identified herein as A, X represents —OR or —NR$_2$, and R represents hydrogen, a saturated hydrocarbon radical, or a substituted saturated hydrocarbon radical. The only requirement for the triazine derivative of this invention is that it have at least one group Y and at least one

group, or the corresponding thio group. The trivalent triazine nucleus is sometimes shown herein as C$_3$N$_3$.

Applicant's copending application, Serial No. 767,778, filed October 17, 1958, now U.S. Patent 3,011,998, issued Dec. 5, 1961, of which this is a continuation-in-part, is particularly directed to aldehyde reaction products of certain monomeric materials disclosed and claimed herein. However, the new compounds of this invention can also be used for various other purposes such as fire retardants, rust inhibitors, chemical intermediates, rust removers, electroplating additives, herbicides and insecticides, ion exchange resins, tanning agents, water soluble interfacial agents, water insoluble dispersion agents, detergents and wetting agents, gasoline inhibitors, monomers for vinyl polymerizations and copolymers.

Versatility in the compounds of this invention is derived from the fact that when one

group is attached to a triazine ring, two other groups which vary widely in chemical character can be attached to the triazine ring. The properties of this phosphonic group are pronounced and effective even when only one such group is present. Furthermore, this versatility is increased by the wide and large number of variations that can be made in the phosphonic or phosphonium structure, such as

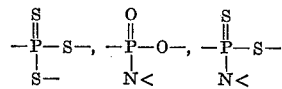

as well as in the nature of the groups attached to the —O—, —S—, and —N atoms. Methods of preparing the various phosphites, thiophosphites and mixed phosphites for use in this invention are given in "Organo-Phosphorus Compounds" by G. M. Kosolapoff (John Wiley & Sons, Inc., 1950).

The various phosphites, thiophosphites and mixed phosphites used in preparing the compounds of this invention can be represented by the formula P(X—R)$_3$ where X represents O or S, and R is as defined elsewhere herein but in these phosphite compounds is preferably a hydrocarbon group of no more than about 12 carbon atoms. These compounds can be reacted with chlorotriazines at a temperature of at least 50° C., preferably at least 80° C. to displace the chlorine and to substitute the desired phosphonic group.

Preferred Y groups are: the amino group and mono and di-substituted amino groups in which the substituent groups are hydrocarbon and substituted hydrocarbon groups, such as aliphatic, aromatic, cycloaliphatic groups including those having ethylenic or acetylenic unsaturation therein, spiro groups, etc., preferably hydrocarbon and hydrocarbon-substituted groups of more than 30 carbon atoms, and the substituent groups in the hydrocarbon substituted groups can be hydroxy, acyl acyloxy, amino, halo, alkoxy, aryloxy, cycloalkoxy, nitro, hydrazino, mercapto, alkylsulfo, arylsulfo, cycloalkylsulfo, ureido, etc., hydroxy and mercapto groups and the corresponding ether and thioether groups in which the radical on the ether or thioether is a hydrocarbon or hydrocarbon-substituted group as defined above; nitro; acyl; acyloxy; alkoxy; aryloxy; cycloalkoxy, hydrazino, ureido, hydrazino, etc., as well as the various other aldehyde-reactable groups referred to herein.

Typical preferred groups include but are not restricted to the following:

| Y Groups | $-\overset{O}{\underset{X}{\overset{\|}{P}}}-OR$ Groups |
|---|---|
| H$_2$N— | $-\overset{O}{\overset{\|}{P}}-(OC_2H_5)_2$ |
| HO— | |
| HS— | $-\overset{O}{\overset{\|}{P}}-(OCH_3)_2$ |
| HOC$_6$H$_4$NH— | $-\overset{O}{\underset{NHC_6H_5}{\overset{\|}{P}}}-OC_2H_5$ |
| ClC$_6$H$_4$— | |
| C$_6$H$_5$— | $-\overset{O}{\underset{N(CH_3)_2}{\overset{\|}{P}}}-OCH_3$ |
| C$_4$H$_9$— | |
| H$_2$NOCCH$_2$S— | $-\overset{O}{\overset{\|}{P}}(-OC_3H_7)_2$ |
| HOC$_6$H$_4$NH— | |
| (CH$_3$)$_2$N— | $-\overset{O}{\underset{N(C_2H_5)_2}{\overset{\|}{P}}}-OC_3H_7$ |
| (C$_2$H$_5$)$_2$N— | |
| CH$_3$NH— | $-\overset{O}{\underset{NHC_{10}H_{21}}{\overset{\|}{P}}}-OC_3H_7$ |
| CH$_3$O— | |
| C$_6$H$_5$O— | $-\overset{O}{\overset{\|}{P}}(-OC_4H_9)_2$ |
| H$_2$NO$_2$SC$_6$H$_4$NH— | $-\overset{O}{\underset{NH_2}{\overset{\|}{P}}}-OCH_3$ |

| Y Groups | $-\overset{O}{\underset{X}{\overset{\|}{P}}}-OR$ Groups |
|---|---|
| $H_5C_2OOC(CH_2)_5NH-$ | $-\overset{O}{\overset{\|}{P}}(-OC_6H_5)_2$ |
| $C_2H_5-$ | $-\overset{O}{\overset{\|}{P}}(-OC_6H_4Cl)_2$ |
| $HOCH_2CH_2NH-$ | $-\overset{O}{\overset{\|}{P}}(-OC_5H_{11})_2$ |
| $NCCH_2CH_2S-$ | $-\overset{S}{\overset{\|}{P}}(-S-C_2H_5)_2$ |
| $H_2NCONHNH-$ | $-\overset{S}{\overset{\|}{\underset{NHC_6H_5}{P}}}-S-C_2H_5$ |
| $H_2NCONH-$ | |
| $H_2NO_2SC_6H_4NHOCCH_2S-$ | $-\overset{S}{\overset{\|}{\underset{NHC_6H_4OH}{P}}}-S-C_2H_5$ |
| $HOC_6H_4NHOCCH_2S-$ | $-\overset{O}{\overset{\|}{P}}(-OCH_2CH=CH_2)_2$ |
| $H_2NOCC_6H_4O-$ | $-\overset{O}{\overset{\|}{P}}(-OCH_2C_6H_5)_2$ |
| $H_{37}C_{18}NH-$ | $-\overset{O}{\overset{\|}{P}}(-OC_6H_{11})_2$ |
| $H_{21}C_{10}NH-$ | $-\overset{O}{\overset{\|}{P}}(-OC_{10}H_{21})_2$ |
| $H_{11}C_5NH-$ | $-\overset{O}{\overset{\|}{P}}(-OCH_2C_6H_4Br)_2$ |
| $(CH_3)_2NCH_2NH-$ | $-\overset{O}{\overset{\|}{P}}(-ONa)_2$ |
| $(C_2H_5)_2NCH_2NH-$ | $-\overset{O}{\overset{\|}{P}}(-OH)_2$ |
| $HOCH_2NH-$ | $-\overset{O}{\overset{\|}{P}}(-O-M)_2,$ where M is a metal. |
| $HO(C_2H_5)CHNH$ | |
| $HO(CH_3)CHNH$ | |

The aldehyde-reactable group is a grouping of atoms or radicals that react with aldehyde or polymeric-aldehydes to form a derivative such as illustrated by the following:

(a)
$$-NH_2 + CH_2O \longrightarrow -NHCH_2OH \xrightarrow{CH_2O} -N(CH_2OH)_2$$

(b)
$$-NHR \xrightarrow{CH_2O} -\underset{\underset{CH_2OH}{|}}{\overset{R}{\underset{|}{N}}}$$

(c)
$$-C_6H_4NH_2 \xrightarrow{CH_2O} -C_6H_4N=CH_2$$

(d)
$$-C_6H_4OH \xrightarrow{CH_2O} \text{(phenol with } -OH, -CH_2OH\text{)} \xrightarrow{CH_2O} \text{(phenol with } -OH, -CH_2OH, -CH_2OH\text{)}$$

(e)
$$-CH_2-\underset{\underset{OH}{|}}{CH}-CH_2-\underset{\underset{OH}{|}}{CH}- \xrightarrow{CH_2O} -CH_2-CH-CH_2-CH- \text{ with } O-CH_2-O \text{ bridge}$$

As illustrative examples of the aldehyde-reactable group, A, there are mentioned the following groups:

$$-S-(CR_2)_x-\overset{Y}{\overset{\|}{C}}-NHR$$

as disclosed in my U.S. Patent 2,295,562, issued September 15, 1942, wherein $x$ is an integer of at least 1 and not more than 2, Y represents a member of the class consisting of oxygen and sulfur, and R represents a member of the class consisting of hydrogen and monovalent hydrocarbon and halohydrocarbon radicals;

$$-NR-NR\overset{Y}{\overset{\|}{C}}-NHR$$

as disclosed in my U.S. Patent 2,295,565, issued September 15, 1942, wherein Y represents a member of the class consisting of oxygen and sulfur, and R represents a member of the class consisting of hydrogen and monovalent hydrocarbon and halohydrocarbon radicals;

$$-N\underset{\underset{HN}{|}}{\overset{H}{\underset{|}{\phantom{N}}}}\underset{\underset{NHR}{}}{\overset{}{C}}-NHR$$

as disclosed in my U.S. Patent 2,295,562, issued September 15, 1942, wherein R represents a member of the class consisting of hydrogen and monovalent hydrocarbon and halohydrocarbon radicals;

$$-NR\overset{Y}{\overset{\|}{C}}-NHR$$

as disclosed in my U.S. Patent 2,312,688, issued March 2, 1943, wherein Y represents a member of the class consisting of oxygen and sulfur and R represents a member of the class consisting of hydrogen and hydrocarbon radicals and halohydrocarbon radicals;

$$-SC_nR_{2n}\overset{Z}{\overset{\|}{C}}-NR-Y-SO_2NHR$$

as disclosed in my U.S. Patent 2,312,690, issued March 2, 1943, wherein $n$ represents an integer and is at least one and not more than 2, Z represents a member of the class consisting of oxygen and sulfur, Y represents a bivalent carbocyclic radical, and R represents a member of the class consisting of hydrogen and monovalent hydrocarbon radicals and substituted hydrocarbon radicals;

$$-NR-Z''-SO_2NHR$$

as disclosed in my U.S. Patent 2,312,697, issued March 2, 1943, wherein Z'' represents an aryl nucleus and R represents a member of the class consisting of hydrogen and monovalent hydrocarbon radicals and substituted hydrocarbon radicals;

$$-SC_nR_{2n}\overset{Z'}{\overset{\|}{C}}-NR-Y-OH$$

as disclosed in my U.S. Patent 2,312,700, issued March 2, 1943, wherein $n$ represents an integer and is at least one and not more than 2, Z' represents a member of the class consisting of oxygen and sulfur, Y represents a divalent carbocyclic radical and R represents a member of the class consisting of hydrogen and monovalent hydrocarbon radicals and substituted hydrocarbon radicals;

$$-NHR$$

as disclosed in my U.S. Patent 2,335,846, issued December 7, 1943, wherein R represents a member of the class consisting of hydrogen and monovalent hydrocarbon radicals and halohydrocarbon radicals;

$$-Z-CONHR$$

wherein Z represents a divalent hydrocarbon radical and R represents hydrogen and a monovalent hydrocarbon radical and substituted hydrocarbon radicals;

$$-B-Z-CONHR$$

wherein B represents a member of the class consisting of oxygen, sulfur and —NR, Z represents a divalent hydrocarbbon radical and substituted hydrocarbon radicals, and R represents a member of the class of hydrogen and monovalent hydrocarbon radicals and substituted hydrocarbon radicals;

HNR—NR— wherein R reperesents a member of the class consisting of hydrogen and monovalent hydrocarbon radicals and substituted hydrocarbon radicals;

HO—Z'— wherein Z' represents a divalent aromatic radical and substituted hydrocarbon radicals as hereinabive defined. A few typical triazine compounds are

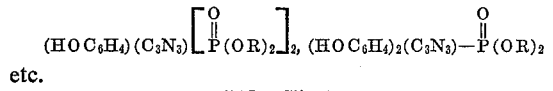
etc.

HO—Z'—NR wherein R represents hydrogen and monovalent hydrocarbon radicals and substituted hydrocarbon radicals, and Z represents a divalent aromatic radical and substituted hydrocarbon radicals as hereinabove described. A few typical compounds are

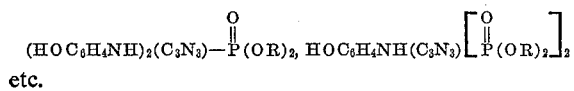
etc.

RCONHNR— wherein R represents hydrogen and a monovalent hydrocarbon radical and substituted hydrocarbon radicals as previously defined hereinabove.

R"NCY—NR"—CHR'— as disclosed in my U.S. Patent 2,339,623, issued January 18, 1944, wherein Y represents oxygen or sulfur, at least one R" represents hydrogen and the other R's represent hydrogen, a monovalent hydrocarbon radical or a monovalent halogenated hydrocarbon radical, and R' represents hydrogen or a monovalent aliphatic, carbocyclic or aromatic hydrocarbon radical of not more than 6 carbon atoms; etc.

Thus it may be seen that A may be any aldehyde-reactable group.

In the above triazine derivative formula, Y can be R which represents hydrogen or any monovalent saturated hydrocarbon radical, whether substituted or unsubstituted, aliphatic, carbocyclic, aryl or heterocyclic, mono- or poly-nuclear, etc. Examples of suitable hydrocarbon groups represented by R are aliphatic, aromatic, e.g., methyl, ethyl, propyl, isopropyl, butyl, secondary butyl, amyl, hexyl, cyclopentyl, cyclohexyl, methylcyclohexyl, phenyl, diphenyl, naphthyl, tolyl, xylyl, ethylphenyl, propylphenyl, isopropylphenyl, benzyl, phenylpropyl, etc. and their homologues, as well as those groups with one or more of their hydrogen atoms substituted by halogens, as, for example, fluorine, chlorine, nitro groups, nitroso groups, amino groups, carboxy groups, carbalkoxy groups, methoxy- and aryloxy groups, mercapto groups, etc.; in addition to the saturated type of hydrocarbon radicals represented by R, e.g., those having no aliphatic unsaturation therein, Y can also represent unsaturated hydrocarbon groups, such as butenyl, allyl, methallyl, pentenyl, cyclopentenyl, phenylallyl, allylphenyl, etc., and various derivatives thereof as indicated above; Y can also be hydroxyl and the alkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, the o-, m-, and p-cresols, the xylenols, the naphthols, ethylene glycol, methyl glycol ether, butyl glycol ether, glycerine, pentaerythritol, naphthol, hydroxy pyridine, including the alkoxy and aryloxy radicals of hydroxy acids and esters such as lactic acid, ethyl lactate, allyl lactate, methyl salicylate, and the chloro derivatives such as chlorophenol, chloronaphthol, ethylene chlorohydrin, and the acetoxy derivatives such as acetoxyethyl alcohols, etc., and these radicals are represented by RO—; Y can also be R—S— groups which are the mercapto equivalents to RO—; Y can also be —NR$_2$, that is, an amino group, a monosubstituted amino group or a disubstituted amino group, as for example, the radicals of methylamine, ethylamine, butylamine, nonylamine, benzyl amine, dimethyl amine, aniline, naphthylamine, ethanol amine, diethanolamine, diisopropylamine, methylaniline, piperidine, aminopyridine, and the hydrazine radicals, namely, R$_2$NNR— from hydrazine, unsymmetrical dimethyl hydrazine, symmetrical dimethyl hydrazine, trimethyl hydrazine, phenyl hydrazine; Y can also be the N-radicals of the aminoacids, the amino-esters, the amino-amides, and the amino-nitriles, specific examples of which are

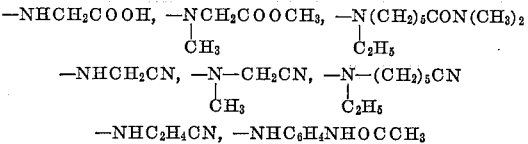

Y can also be radicals of alkylene imines such as for example

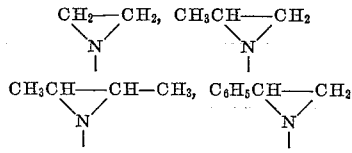

and the radicals of malonic esters and substituted malonic esters, nitriles and amides, such as, for example,

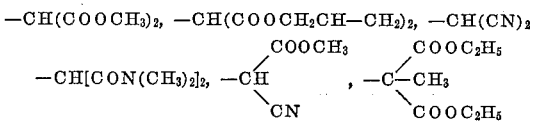

etc.; or Y can be the radical of another triazinyl ring, e.g., $(CH_3NH)_2(C_3N_3)$—, $(HO)_2(C_3N_3)$—, or the triazine ring can be attached through a bridge, such as

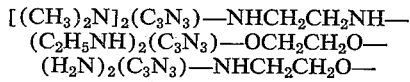

etc.; Y can also be chlorine, bromine, —CN, COOR, etc.; as well as A and

Typical compounds of this invention are the triazines having the substituents indicated by the groups attached to the structure

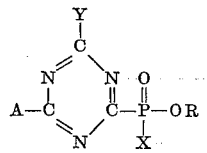

in the following table, wherein substituent G represents the

group.

| Substituent A | Substituent Y | Substituent G |
|---|---|---|
| —NH₂ | —NH₂ | $-\overset{\overset{O}{\|}}{P}(OCH_3)_2$ |
| —NH₂ | —NH₂ | $-\overset{\overset{O}{\|}}{P}(OC_2H_5)_2$ |
| —NH₂ | $-\overset{\overset{O}{\|}}{P}(OC_2H_5)_2$ | $-\overset{\overset{O}{\|}}{P}(O_2C_5)_2$ |
| —NHC₆H₅ | —NH₂ | $-\overset{\overset{O}{\|}}{P}(OC_3H_7)_2$ |
| —NHCH₃ | —NHCH₃ | $-\overset{\overset{O}{\|}}{P}(OC_3H_7)_2$ |
| —NH₂ | —Cl | $-\overset{\overset{O}{\|}}{P}(OC_2H_5)_2$ |
| —NH₂ | —OH | $-\overset{\overset{O}{\|}}{P}(OCH_2CH=CH_2)_2$ |
| NH₂OCCH₂—S— | NH₂—OCCH₂—S— | $-\overset{\overset{O}{\|}}{\underset{\underset{NHC_6H_5}{\|}}{P}}-OC_2H_5$ |
| NH₂CONHNH— | NH₂CONHNH— | $-\overset{\overset{O}{\|}}{\underset{\underset{N(CH_3)_2}{\|}}{P}}-OC_2H_5$ |
| HOC₆H₄S— | HOC₆H₄S— | $-\overset{\overset{O}{\|}}{P}(OC_2H_5)_2$ |
| HOC₆H₄NH— | HOC₆H₄NH— | $-\overset{\overset{O}{\|}}{P}(OC_2H_5)_2$ |
| 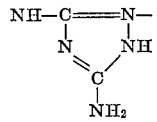 | —OC₆H₅ | $-\overset{\overset{O}{\|}}{P}(OC_2H_5)_2$ |
| 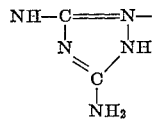 | —OC₆H₄CH₂—CH=CH₂ | $-\overset{\overset{O}{\|}}{P}(OC_2H_5)_2$ |
| 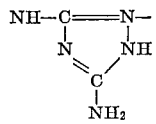 | $-N\overset{\diagup CH_2}{\diagdown CH_2}$ | $-\overset{\overset{O}{\|}}{P}(OC_2H_5)_2$ |
| NH₂CONH— | $-N\overset{\diagup CH_2-CH_2}{\diagdown CH_2-CH_2}O$ | $-\overset{\overset{O}{\|}}{P}(OC_2H_5)_2$ |
| H₂NSO₂C₆H₄NH— | —OCH₂CH₂OC₆H₅ | $-\overset{\overset{O}{\|}}{P}(OC_2H_5)_2$ |
| H₂NSO₂C₆H₄NH— | —CH₂CH₂OH | $-\overset{\overset{O}{\|}}{P}(OC_2H_5)_2$ |
| H₂NO₂SC₆H₄O— | —CH₂CH₂CN | $-\overset{\overset{O}{\|}}{P}(OC_2H_5)_2$ |
| H₂NO₂SC₆H₄S— | —CH₂COOCH₃ | $-\overset{\overset{O}{\|}}{P}(OC_2H_5)_2$ |
| 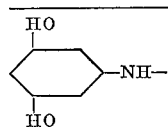 | $-\overset{\overset{COOC_2H_5}{\|}}{\underset{\underset{COOC_2H_5}{\|}}{CH}}$ | $-\overset{\overset{O}{\|}}{P}(OC_2H_5)_2$ |

| Substituent A | Substituent Y | Substituent G |
|---|---|---|
| $CH_3CONHNH-$ | $-S-C_6H_5$ | $-\overset{O}{\underset{\|}{P}}(OC_2H_5)_2$ |
| $\begin{array}{c} NH_2 \\ \| \\ C-N \\ \|\hspace{4mm}\backslash \\ N\hspace{4mm}C-NHNH- \\ \|\hspace{4mm}/ \\ C=N \\ \| \\ NH_2 \end{array}$ | $-N-(C_6H_{11})_2$ | $-\overset{O}{\underset{\|}{\underset{NHC_6H_5}{P}}}-OC_2H_5$ |
| $\begin{array}{c} NH_2 \\ \| \\ C-N \\ \|\hspace{4mm}\backslash \\ N\hspace{4mm}C-NHNH- \\ \|\hspace{4mm}/ \\ C=N \\ \| \\ NH_2 \end{array}$ | $\begin{array}{c} CH_3 \\ \| \\ -N-C_6H_4NO_2 \end{array}$ | $-\overset{O}{\underset{\|}{\underset{NHC_6H_4Cl}{P}}}-OC_2H_5$ |
| $\begin{array}{c} NH_2 \\ \| \\ C-N \\ \|\hspace{4mm}\backslash \\ N\hspace{4mm}C-NHCH_2CH_2NH- \\ \|\hspace{4mm}/ \\ C=N \\ \| \\ NH_2 \end{array}$ | $-C_6H_5$ | $-\overset{O}{\underset{\|}{\underset{NHC_6H_4OCH_3}{P}}}-OC_2H_5$ |
| $\begin{array}{c} NH_2 \\ \| \\ C-N \\ \|\hspace{4mm}\backslash \\ N\hspace{4mm}C-NHCH_2CH_2NH- \\ \|\hspace{4mm}/ \\ C=N \\ \| \\ NH_2 \end{array}$ | $-N\begin{array}{c}CH_2CH=CH_2 \\ \\ CH_2CH=CH_2\end{array}$ | $-\overset{O}{\underset{\|}{P}}(OC_2H_5)_2$ |
| $NH_2-$ | $-OC_6H_4COOC_2H_5$ | $-\overset{O}{\underset{\|}{P}}(OC_2H_5)_2$ |
| $NH_2-$ | $\begin{array}{c} CH_3 \\ \| \\ -N-C_{10}H_7Cl \end{array}$ | $-\overset{O}{\underset{\|}{P}}(OC_2H_5)_2$ |
| $NH_2-$ | $-OCH_2CH_2O-C\begin{array}{c}N=C-N(CH_3)_2 \\ \| \hspace{10mm} \| \\ N \hspace{10mm} N \\ \| \hspace{10mm} \| \\ C=N-C-N(CH_3)_2\end{array}$ | $-\overset{O}{\underset{\|}{P}}(OC_2H_5)_2$ |
| $NH_2-$ | $-OCH_2CH_2O-C\begin{array}{c}N=C-N(CH_3)_2 \\ \| \hspace{10mm} \| \\ N \hspace{10mm} N \\ \| \hspace{10mm} \| \\ C=N-C-N(CH_3)_2\end{array}$ | $-\overset{O}{\underset{\|}{P}}(OC_3H_7)_2$ |
| $H_2NO_2SC_6H_4NH-$ | $H_2NO_2SC_6H_4NH-$ | $-\overset{O}{\underset{\|}{P}}(OC_2H_5)_2$ |
| $CH_3NHO_2SC_6H_4NH-$ | $CH_3NHO_2SC_6H_4NH-$ | $-\overset{O}{\underset{\|}{P}}(OC_2H_5)_2$ |
| $H_2NOC(CH_2)_5NH-$ | $H_2NOC(CH_2)_5NH-$ | $-\overset{O}{\underset{\|}{P}}(OC_2H_5)_2$ |
| $NH_2CONHNHOCCH_2-$ | $NH_2CONHNHOCCH_2-$ | $-\overset{O}{\underset{\|}{P}}(OC_2H_5)_2$ |
| $NH_2OCCH_2O-$ | $H_2NO_2SC_6H_4NH-$ | $-\overset{O}{\underset{\|}{P}}(OC_2H_5)_2$ |
| $\begin{array}{c}NH_2OC \\ \hspace{6mm}\backslash \\ \hspace{10mm}CH- \\ \hspace{6mm}/ \\ NH_2OC\end{array}$ | $\begin{array}{c}H_2NOC \\ \hspace{6mm}\backslash \\ \hspace{10mm}CH- \\ \hspace{6mm}/ \\ H_2NOC\end{array}$ | $-\overset{O}{\underset{\|}{P}}(OC_2H_5)_2$ |
| $(NH_2O_2S)_2C_6H_3NH-$ | $(H_2NO_2S)_2C_6H_3NH-$ | $-\overset{O}{\underset{\|}{P}}(OC_2H_5)_2$ |
| $H_2NO_2SC_6H_4NH-$ | $-\overset{O}{\underset{\|}{\underset{OC_2H_5}{P}}}-OC_2H_5$ | $-\overset{O}{\underset{\|}{P}}(OC_2H_5)_2$ |

| Substituent A | Substituent Y | Substituent G |
|---|---|---|
| $H_2NO_2SC_6H_4NH-$ | $\begin{matrix} O \\ \| \\ -P-OC_2H_5 \\ \| \\ NHC_6H_5 \end{matrix}$ | $\begin{matrix} O \\ \| \\ -P-OC_2H_5 \\ \| \\ NHC_6H_5 \end{matrix}$ |
| $H_2NO_2SC_6H_4NH-$ | $\begin{matrix} O \\ \| \\ -P-(OC_2H_5)_2 \end{matrix}$ | $\begin{matrix} O \\ \| \\ -P-OC_2H_5 \\ \| \\ NHC_6H_5 \end{matrix}$ |

The triazine derivatives of the present invention are prepared conveniently by condensing the corresponding chloro-triazines with a phosphoric acid ester, etc.

1)
$$(A)_2(C_3N_3)Cl + P(OR)_3 \longrightarrow RCl + (A)_2(C_3N_3)\overset{O}{\underset{OR}{\overset{\|}{P}}}-OR$$

or

2)
$$\begin{matrix}(A) \\ (Y)\end{matrix}\!\!\!\!\!\!>\!\!(C_3N_3)Cl + P(OR)_3 \longrightarrow RCl + \begin{matrix}(A) \\ (Y)\end{matrix}\!\!\!\!\!\!>\!\!(C_3N_3)\overset{O}{\underset{OR}{\overset{\|}{P}}}-OR$$

or (3)
$$(A)(C_3N_3)Cl_2 + 2P(OR)_3 \longrightarrow 2RCl + A-(C_3N_3)\left[\overset{O}{\underset{OR}{\overset{\|}{P}}}-OR\right]_2$$

wherein A, R, and Y are as previously defined and $(C_3N_3)$ represent the 1,3,5-triazine ring. Some specific examples of the above are:

(1)
$$(NH_2)_2(C_3N_3)Cl + P(OC_2H_5)_3 \longrightarrow$$
$$C_2H_5Cl + (NH_2)_2(C_3N_3)\overset{O}{\underset{OC_2H_5}{\overset{\|}{P}}}-OC_2H_5$$

(2)
$$\begin{matrix}(NH_2) \\ (HO)\end{matrix}\!\!\!\!\!\!>\!\!(C_3N_3)Cl + P(OCH_2CH=CH_2)_3 \longrightarrow$$
$$CH_2=CHCH_2Cl + \begin{matrix}H_2N \\ HO\end{matrix}\!\!\!\!\!\!>\!\!(C_3N_3)\!\!\left(\overset{O}{\underset{OCH_2CH=CH_2}{\overset{\|}{P}}}-OCH_2CH=CH_2\right)$$

(3)
$$CH_3NH-(C_3N_3)Cl_2 + 2P(OCH_3)_3 \longrightarrow$$
$$2CH_3Cl + (CH_3NH)(C_3N_3)\left[\overset{O}{\underset{OCH_3}{\overset{\|}{P}}}-OCH_3\right]_2$$

Alternately, these compounds can be prepared by using a chlorotriazinyl phosphoric ester with a compound containing a reactive hydrogen, represented by MH wherein M represents Y or A groups, as defined above, for example:

(1)
$$(Cl_2)(C_3N_3)\overset{O}{\underset{OR}{\overset{\|}{P}}}-OR + MH \xrightarrow{\text{hydrohalide acceptor}} (M)_2(C_3N_3)-\overset{O}{\underset{OR}{\overset{\|}{P}}}-OR$$

(2)
$$Cl-(C_3N_3)\left[\overset{O}{\underset{OR}{\overset{\|}{P}}}-OR\right]_2 + 2MH \xrightarrow{\text{hydrohalide acceptor}} M-C_3N_3-\left[\overset{O}{\underset{OR}{\overset{\|}{P}}}-OR\right]_2$$

or, as an illustration:

(1a)
$$(Cl)_2(C_3N_3)\overset{O}{\underset{OCH_3}{\overset{\|}{P}}}-OCH_3 + 2C_6H_5NH_2 \xrightarrow{NaOH}$$

$$\longrightarrow (C_6H_5NH)_2(C_3N_3)-\overset{O}{\underset{OCH_3}{\overset{\|}{P}}}-OCH_3$$

or (2a)
$$Cl-(C_3N_3)\left[\overset{O}{\underset{OCH_3}{\overset{\|}{P}}}-OCH_3\right]_2 + 2NH_3 \xrightarrow{NaOH}$$

$$NH_2-(C_3N_3)\left[\overset{O}{\underset{OCH_3}{\overset{\|}{P}}}-OCH_3\right]_2$$

Illustrative of MH compounds are the alcohols such as $CH_3OH$, $C_2H_5-OH$, $(CH_3)_2CHOH$, $C_4H_9OH$, $C_{12}H_{26}OH$, etc.; the cycloaliphatic alcohols such as cyclohexanol, cycloheptanol, cyclopentanol, etc.; ammonia and the amines, e.g., $CH_3NH_2$, $C_2H_5NH_2$ $(CH_3)_2NH$,
$$CH_2=CH-CH_2NH_2,$$
$C_6H_5NH_2$, $CH_3C_6H_4NH_2$, $ClC_6H_4NHCH_3$, cyclohexylamine, etc., as well as other reactive-hydrogen-containing compounds having the A and Y groups indicated above.

The triazinyl derivatives of this invention can be converted to the phosphonic acid or salt by hydrolyzing the ester with an alkali or acid, e.g.

$$(NH_2)_2(C_3N_3)\left[\overset{O}{\underset{OC_2H_5}{\overset{\|}{P}}}-OC_2H_5\right] + 2NaOH \longrightarrow$$

$$(NH_2)_2(C_3N_3)-\overset{O}{\underset{ONa}{\overset{\|}{P}}}-ONa$$

or $$NH_2-(C_3N_3)\left[\overset{O}{\underset{OC_2H_5}{\overset{\|}{P}}}-OC_2H_5\right]_2 + 4NaOH \longrightarrow$$

$$NH_2-C_3N_3\left[\overset{O}{\underset{ONa}{\overset{\|}{P}}}-ONa\right]_2$$

and the free acid can be liberated from the alkali salt by treatment with an inorganic acid or with a cation exchange resin. The triazinyl phosphonic esters of this invention can also be treated with ammonia or amines to produce the phosphonamide, for example, $$(NH_2)_2(C_3N_3)-\overset{O}{\underset{OC_2H_5}{\overset{\|}{P}}}-OC_2H_5 + C_6H_5NH_2 \longrightarrow$$

$$(NH_2)_2(C_3N_3)-\overset{O}{\underset{NHC_6H_5}{\overset{\|}{P}}}-OC_2H_5$$

This invention will be more fully described by the following examples. The invention is not to be regarded, however, as restricted in any way by these examples and they are to serve merely as illustrations. In these examples, as well as throughout the specification, "parts"

and "percentages" shall mean parts by weight and percentages by weight unless specifically provided otherwise.

EXAMPLE I

*Synthesis of monomers*

In a suitable reactor equipped with stirrer and reflux condenser a mixture of 145.5 parts of 2,4-diamino-6-monochloro-1,3,5-triazine and 200 parts of triethyl phosphite and 200 parts of benzene are heated at reflux for eight hours, at which time no more ethyl chloride is released from the reaction. The reaction is then cooled and the solid

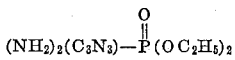

separated by filtration, washed with alcohol and dried, which on analysis gives the following values: 34% carbon, 28.1% nitrogen, 5.35% hydrogen, and 12.2% phosphorous, and a molecular weight of 246.1, which values are in close agreement with the theoretical values. When 165 parts of the corresponding monoamino-dichlorotriazine are reacted instead of the monochlorotriazine with 380 parts of triethyl phosphite, and the reaction product isolated, there is obtained an almost quantitative yield of

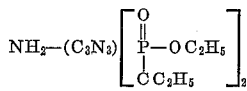

which on analysis gives values of 35.16% carbon, 5.89% hydrogen, 15.35% nitrogen, and 17.21% phosphorus, and a molecular weight of 367.1, which values are in close agreement with the theoretical values. When this diester is allowed to stand at room temperature with aniline, the corresponding

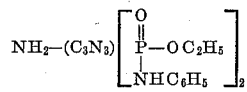

is obtained. These compounds are very effective as fire retardants when impregnated into wood, etc. according to standard methods, and are also effective as tanning agents for leather.

When halotriazines of the formula $(A)_2(C_3N_3)Cl$, or

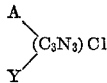

or $A(C_3N_3)Cl_2$ are used instead of the halotriazines of the preceding example, the corresponding triazine derivatives are obtained. These products show very good fire retardant properties.

EXAMPLE II

One hundred forty-seven (147) parts of 2-chloro-4,6-dihydroxy-s-triazine, prepared from cyanuric chloride by the method given in J. Prakt. Chem. (2), 75, 103, (1907), are reacted with 104 parts of trimethyl phosphite according to the procedure of Example I, a quantitative yield of

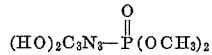

is obtained. When an equivalent weight of 2,4-dichloro-6 hydroxy-s-triazine is used instead of 2-chloro-4,6-dihydroxy compound, the corresponding derivative

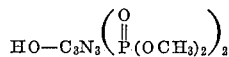

is obtained in quantitative yield.
When

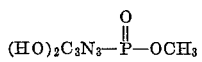

is treated with aniline, methyl amine or diethyl amine, according to the procedure of Example I, the corresponding amides are obtained respectively,

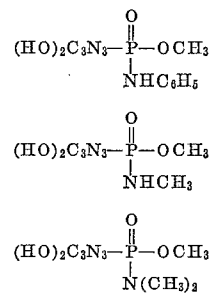

These compounds are very effective when tested as rust inhibitors.

EXAMPLE III

Two hundred thirty-six (236) parts of

prepared according to the procedure of U.S. Patent 2,393,-755, in 250 parts of benzene are refluxed ten hours with 195 parts of tri-n-propyl phosphite after which the benzene is removed under a reduced pressure using a water aspirator to give a quantitative yield of crude but relatively pure

When an equivalent amount of $(HOC_6H_4NH)_2C_3N_3Cl$ (see U.S. Patent 2,393,755) is used instead of the dichloro-triazine of this example there is obtained

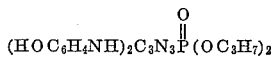

Treatment of these phosphonic esters with the aniline, methyl amine and diethyl amine respectively by the procedure of Example I produces the corresponding phosphonamides, whereas when diethyl amine or decyl amine is used, there is obtained respectively

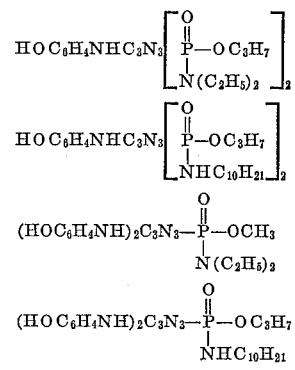

EXAMPLE IV 2-amino-4,6-dichloro-s-triazine prepared according to the method of Berichte, 32, 691 (1889) is converted to 2-amino,4-hydroxy-6-chloro-s-triazine by the hydrolysis procedure of J. Prakt. Chem. (2), 75, 103 (1907). Thereafter, 136 parts of 2-amino-4-hydroxy-6-chloro-s-triazine are reached with 250 parts of tri-n-butyl phosphite according to the procedure of Example I and there is obtained

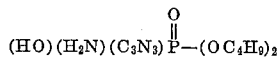

This product is suitable for removing rust from metal surfaces.

EXAMPLE V

One hundred thirty-eight (138) parts of 2-amino-4,6-dichloro-s-triazine are mixed with 250 parts of tri-secondary butyl phosphite and allowed to react in a suitable container at room temperature for twenty-four hours at 60° C. for 8 hours, and there is obtained on recrystallization of the reaction product from acetone-water substantial yield of

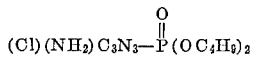

This compound shows excellent properties as an additive to an electroplating bath.

EXAMPLE VI

Two hundred and fifteen (215) parts of 2-phenyl-4,6-dichloro-s-triazine prepared by the procedure of U.S. Patent 1,911,689 is reacted by the procedure of Example III with 210 parts of trimethyl phosphite and there is obtained

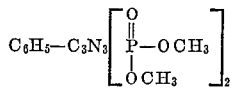

Treatment of this product with ammonia and aniline according to the procedure of Example I results in

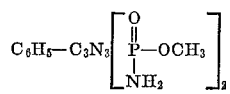

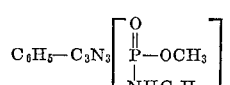

These products are very effective when tested as herbicides and insecticides.

EXAMPLE VII

One hundred and nine (109) parts of

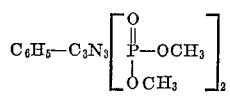

are heated at 100° C. with 210 parts of phenol containing 1 part of magnesium oxide for 14 hours, or until methanol is no longer released from the reaction. From the reaction product there is obtained

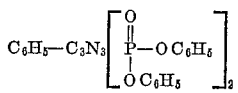

When the procedure is repeated with p-chloro phenol, there is obtained

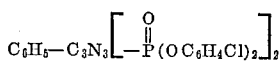

EXAMPLE VIII 2,d-Di-o-dichlorophenyl-6-chloro-s-triazine is prepared by the method of Chem. Ztg 36, 378 (1912) and when this product is used in the procedures of Examples VI and VII, there is obtained respectively

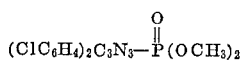

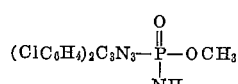

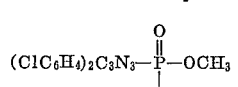

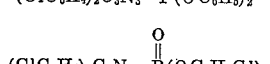

EXAMPLE IX

Cyanuric chloride is converted to 2-butyl-4,6-dichloro-s-triazine by the method of U.S. Patent 1,911,689, and thereafter converted to 2 - butyl,4-chloro-6-thiocarbamyl-methyl sulfide $$(C_4H_9)(NH_2OCCH_2S)C_3N_3—Cl$$

by the methods given in U.S. Patent 2,295,562.

The reaction of this product according to the procedure of Example III with triamyl phosphite yields the compound

EXAMPLE X

Thirty parts of

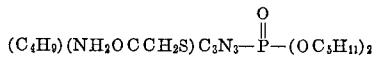

10 parts of 27.1% $CH_2O$ aqueous solution and 0.1 part of NaOH are mixed and allowed to stand 48 hours at room temperature or until substantially all of the formaldehyde has disappeared and there is obtained a dispersion in water of the compound

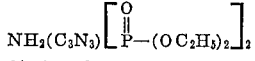

The addition of 4.5 parts of dimethyl amine or 7 parts of diethyl amine to this compound at room temperature produces

and

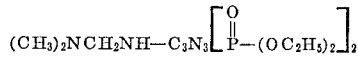

respectively.

EXAMPLE XI

Two hundred ten (210) parts of

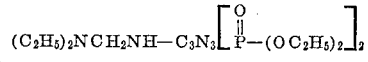

165 parts of 37% formaldehyde aqueous solution, and 3 parts of KOH are allowed to stand at room temperature with constant agitation for 48 hours, or until substantially all of the formaldehyde has disappeared and there is obtained a dispersion of the compound

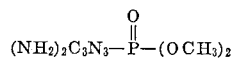

which is dried in a vacuum at room temperature.

EXAMPLE XII

Two hundred (200) parts of 2,4 - di - ethylamino - 6 - chloro-s-triazine prepared by the method of JACS 73, 2982 (1961), is reacted with 155 parts of triethyl phosphite as in the procedure of Example III and there is obtained the compound

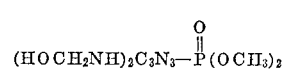

When 203 parts of $P(SC_2H_5)_3$ are substituted for the $P(OC_2H_5)_3$ of this example the corresponding compound

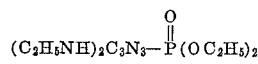

is obtained which, when reacted with aniline according to the procedure of Example I affords

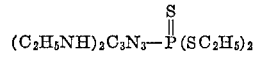
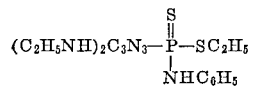

or with p-aminophenol, gives

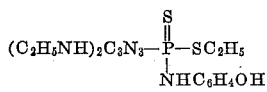

EXAMPLE XIII 2-dimethylamino-4,6-dichloro-s-triazine is prepared according to the procedure of JACS 73, 2982 (1951), and converted to the 4-thiocarbamyl methyl sulfide, $(CH_3NH)(NH_2OCCH_2S)C_3N_3Cl$ by the method given in U.S. Patent 2,295,562, when reacted with triethyl phosphite by the procedures of Example III or Example IX yields

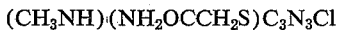

EXAMPLE XIV 2-chloro-4,6-dimethoxy-s-triazine is prepared according to the procedure of JACS 73, 2989 (1951), and reacted with one molar equivalent of triallyl phosphite according to the procedure of Example III, yields

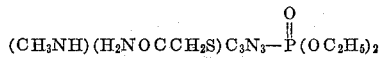

EXAMPLE XV 2,4-dichloro-6-methoxy-s-triazine is prepared according to the procedure of JACS 73, 2989 (1951), and reacted with two molar equivalents of trimethyl phosphite by the procedure of Example III to give

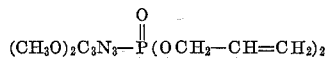

Substitution of 2,4-dichloro-6-phenoxy-s-triazine for the corresponding methoxy derivative in this example produces

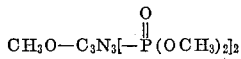

EXAMPLE XVI

Sulfanilamide is reacted with cyanuric chloride to produce 2,4-dichloro-6-(4-sulfamoylanilino)-s-triazine according to the method of J. Org. Chem., 24, 643 (1959), and when this compound is reacted with two molar equivalents of triethyl phosphite according to the procedure of Example III there is obtained the compound

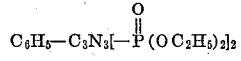

When 2-chloro-4,6-di-(4-sulfamoylanilino)-s-triazine is used instead of the above dichloro compound with at least one molar equivalent of triethyl phosphite, there is obtained instead

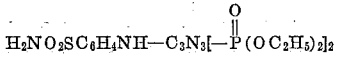

and when 2-amino-4-chloro-6-(4-sulfanoylanilino)-s-triazine is used instead of the dichloro compound, then

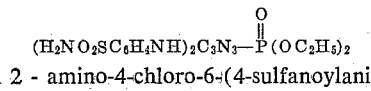

is obtained.

EXAMPLE XVII 2-ethyl-4,6-dichloro-s-triazine is prepared according to the method of U.S. Patent 1,911,689 and converted by reaction with ethyl aminocaproate by the method of U.S. Patent 2,328,961 to $(C_2H_5)[C_2H_5OOC(CH_2)_5-NH]C_3N_3-Cl$ when reacted with one molar equivalent of tribenzyl phosphate by the procedure of Example III produces

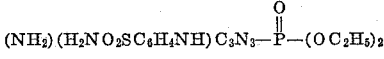

EXAMPLE XVIII

Equivalent quantities of 2,4-dichloro-6-(2-hyroxyethylamino)-s-triazine are substituted for the dichloro-triazine of Example XV and there is obtained a good yield of

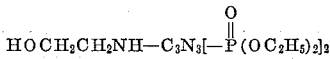

whereas when the 2-chloro-4,6-di(2-hydroxyethylamino)-s-triazine is used with one molar equivalent of the phosphite there is obtained

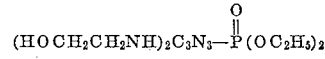

EXAMPLE XIX 2,4-dichloro-6-(beta-cyanoethyl sulfide)-s-triazine is prepared by the method of U.S. Patent 2,295,561 and is treated with two molar equivalents of tri-cyclohexyl phosphite by the procedure of Example III and there is obtained

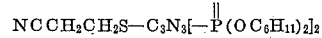

When the above cyanoethyl sulfide derivative is replaced by an equivalent molar quantity of 6-carbanylmethyl sulfide prepared by the procedure of U.S. Patent 2,295,562 there is obtained

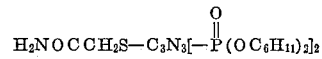

EXAMPLE XX 2,4-dichloro-6-semicarbazido-s-triazine is prepared by the method of U.S. Patent 2,295,565 and treated with two molar equivalent of tridecyl phosphite according to the procedure of Example II, and there is obtained

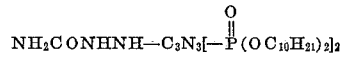

EXAMPLE XXI 2,4-dichloro-6-ureido-s-triazine is prepared according to the method of U.S. Patent 2,295,563 and reacted with tripropyl phosphite by the procedure of Example II, and there is obtained

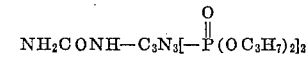

EXAMPLE XXII 2,4-dichloro-6-(p-sulfamyl-phenyl-carbamyl-methyl sulfide) is prepared according to the method of U.S. Patent 2,316,692 and reacted with tri-(p-bromobenzyl)phosphite by the procedure of Example II, and there is obtained

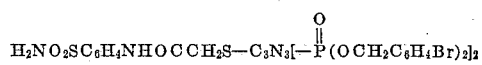

EXAMPLE XXIII 2,4-dichloro-6-amino-s-triazine is converted to 2-parahydroxyphenyl-carbamyl methyl sulfide by reaction with $HSCH_2CONHC_6H_4OH$ by the procedure of U.S. Patent 2,295,562 and when this product is reacted according to the method of Example III, with triethyl phosphite, there is obtained

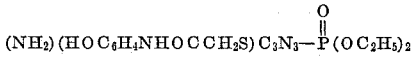

EXAMPLE XXIV

Cyanuric chloride is converted to 2,4-dichloro-6-phenyl-s-triazine by the method of U. S. Patent 1,911,689 and by reaction with para-hydroxy benzamide by the procedure used for $HSCR_2CONH_2$ type compounds in U.S. Patent 2,295,562 to $(C_6H_5)(H_2NOCC_6H_4)C_3N_3-Cl$ when reacted with triethyl phosphite according to the procedure of Example III produces

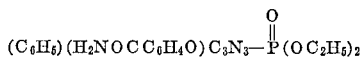

EXAMPLE XXV 2,4-di-octadecylamino-6-monochloro-s-triazine is prepared by the method given in JACS 73, 2982 (1951), and reacted with a molar equivalent of trimethyl phosphite by the procedure of Example III, and the product isolated as

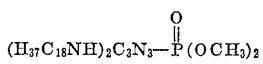

which when saponified by refluxing with methanolic NaOH is converted to

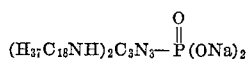

which is water dispersible as wetting agent, emulsifier, or detergent.

If the procedure of this example is repeated, using 2,4-dichloro - 6 - octadecylamino-s-triazine prepared by the method of JACS 73, 2982 (1951), and reacted with two molar equivalent of trimethyl phosphite, there is obtained

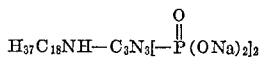

which is a more effective dispersing agent for hard waters. This same behaviour is observed in the lower alkyl derivatives containing a total of at least 10 carbon atoms in the aliphatic chain, thus

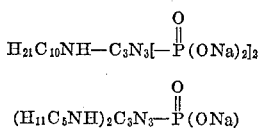

The free acid is readily liberated from these salts by treatment with excess quantities of strong inorganic acids such as sulfuric or phosphoric acid. The free acids are useful as rust inhibitors and pickling agents, and have the formula

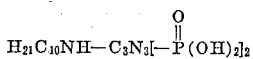

and

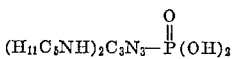

respectively.

Other metal salts such as potassium, lithium, calcium, magnesium, silver, copper, titanium, zirconium, molybdenum, etc., such as those known metals which form both inorganic or organic salts are prepared by the known metathesis reactions, or by treatment or reaction of the oxides or hydroxides of such metals, with the free s-triazine phosphonic acids.

EXAMPLE XXVI

Cyanuric chloride is converted to 2,4-di-mercapto-6-chloro-s-triazine by the method of J. Prakt. Chem. (2), 34, 152 (1886), and when this compound is reacted with molar equivalents of trimethyl phosphite according to the procedure of Example III, there is obtained

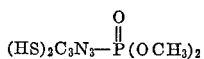

EXAMPLE XXVII

The procedure of Example I is repeated using an equivalent amount of triethyl thiosphosphite in place of the triethyl phosphite and the following respective products are obtained

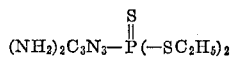

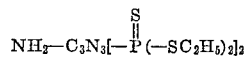

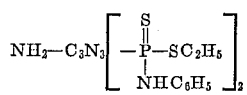

EXAMPLE XXVIII

When the procedure of Example I is repeated using an equivalent amount of mixed phosphites respectively having the formulas $(C_2H_5O)_2P$—$SC_2H_5$ and $$C_2H_5O—P(SC_2H_5)_2$$

products obtained have the formulas:

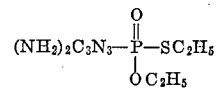

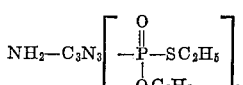

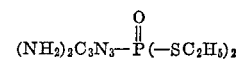

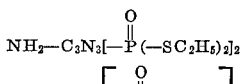

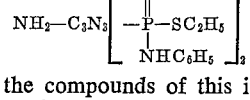

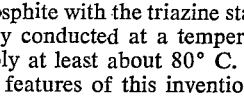

In preparing the compounds of this invention the reaction of the phosphite with the triazine starting compound is advantageously conducted at a temperature of at least 50° C., preferably at least about 80° C.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A symmetrical triazine compound having at least one and no more than two of the three carbon atoms therein attached to a phosphonium radical of the formula

wherein R is a radical selected from the class consisting of hydrogen and saturated hydrocarbon of no more than 12 carbon atoms and X is a radical selected from the class consisting of —OR and —NR$_2$, said symmetrical triazine compound having those carbon atoms therein which are not attached to said phosphonium radical attached to a radical having no more than 12 carbon atoms therein and selected from the class consisting of hydroxy, mercapto, nitro, hydrocarbon carboxylic acyl, hydrocarbon carboxylic acyloxy, alkoxy, aryloxy, cycloalkoxy, alkylsulfo, arylsulfo, cycloalkylsulfo, hydrazino, ureido, hydrazino, and alkyl, aryl, and cycloalkyl.

2. A compound having the formula $$(NH_2)_2C_3N_3—PO(OC_2H_5)_2$$

the C$_3$N$_3$ of said formula representing the trivalent symmetrical nucleus.

3. A compound having the formula $$NH_2—C_3N_3[—PO(OC_2H_5)_2]_2$$

the $C_3N_3$ of said formula representing the trivalent symmetrical nucleus.

4. A compound having the formula $$NH_2-C_3N_3[-PO(OC_2H_5)_2]_2$$
$$|$$
$$NHC_6H_5$$

the $C_3N_3$ of said formula representing the trivalent symmetrical nucleus.

5. A compound having the formula $$(HO)_2C_3N_3-PO(OCH_3)_2$$

the $C_3N_3$ of said formula representing the trivalent symmetrical nucleus.

6. A compound having the formula $$HO-C_3N_3[-PO(OCH_3)_2]_2$$

the $C_3N_3$ of said formula representing the trivalent symmetrical nucleus.

7. A compound having the formula $$HO-C_3N_3\begin{bmatrix} -PO(OCH_3) \\ | \\ N(CH_3)_2 \end{bmatrix}_2$$

the $C_3N_3$ of said formula representing the trivalent symmetrical nucleus.

8. A compound having the formula $$(HOC_6H_4NH)_2C_3N_3-PO(OC_3H_7)_2$$

the $C_3N_3$ of said formula representing the trivalent symmetrical nucleus.

9. A compound having the formula $$HOC_6H_4NH-C_3N_3[-PO(OC_3H_7)_2]_2$$

the $C_3N_3$ of said formula representing the trivalent symmetrical nucleus.

10. A compound having the formula $$HOC_6H_4NH-C_3N_3\begin{bmatrix} -PO(OC_3H_7) \\ | \\ N(C_2H_5)_2 \end{bmatrix}_2$$

the $C_3N_3$ of said formula representing the trivalent symmetrical nucleus.

11. A compound having the formula $$NH_2-C_3N_3-PO(OC_4H_9)_2$$
$$|$$
$$Cl$$

the $C_3N_3$ of said formula representing the trivalent symmetrical nucleus.

12. A compound having the formula $$NH_2-C_3N_3-PO(OC_4H_9)_2$$
$$|$$
$$OH$$

the $C_3N_3$ of said formula representing the trivalent symmetrical nucleus.

13. A compound having the formula $$C_6H_5-C_3N_3[-PO(OC_6H_5)_2]_2$$

the $C_3N_3$ of said formula representing the trivalent symmetrical nucleus.

References Cited by the Examiner

UNITED STATES PATENTS

| | | | |
|---|---|---|---|
| 2,685,581 | 8/54 | Coover | 260—248 |
| 2,751,384 | 6/56 | Coover et al. | 260—248 |
| 2,980,675 | 4/61 | Schwarze | 260—248 |
| 3,011,998 | 12/61 | D'Alelio | 260—45.2 |

WALTER A. MODANCE, *Primary Examiner.*

LEON D. ROSDOL, NICHOLAS S. RIZZO, *Examiners.*